United States Patent [19]

Cramer et al.

[11] Patent Number: 4,600,664
[45] Date of Patent: Jul. 15, 1986

[54] STORAGE BATTERY

[75] Inventors: Wilhelm Cramer; Manfred Schrewe, both of Brilon, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 781,102

[22] Filed: Sep. 27, 1985

[30] Foreign Application Priority Data

Oct. 15, 1984 [DE] Fed. Rep. of Germany ... 8430246[U]

[51] Int. Cl.⁴ ........................ H01M 2/04; H01M 2/12
[52] U.S. Cl. ........................................... 429/7; 429/88
[58] Field of Search ................................ 429/88, 89, 7

[56] References Cited

U.S. PATENT DOCUMENTS 3,937,636  2/1976  Slautterback ............................ 429/7
4,371,591  2/1983  Oxenreider et al. .................. 429/88
4,409,302  10/1983 Poe ........................................ 429/88

Primary Examiner—Donald L. Walton
Attorney, Agent, or Firm—Becker & Becker, Inc.

[57] ABSTRACT

A storage battery having a case closed-off by a block cover in which, for the purpose of separating-off acid, a hollow space is formed by means of a lower cover part and an upper cover part that is spaced from the lower cover part. In conformity with the number of cells, the hollow space is divided into interconnected chambers, each of which communicates at its deepest location with an associated cell via an opening which is in the form of a tubular member. In order to provide a storage battery having improved integrated acid separating-off capability in the block cover, the assembly of which can be undertaken either directly after production of the individual components or during assembly of the battery in the production line, with seal-testing of the connected parts being possible either individually or in combination with the block box of the battery, the tubular members each comprise two separate tubular pieces which are coaxially disposed, with one of the tubular pieces being provided on the lower cover part and extending away from the upper cover part and into the cell, and with the other of the tubular pieces being provided on the upper cover part and extending toward the lower cover part into the chamber. The tubular piece of the upper cover part has a greater diameter than does the tubular piece of the lower cover part, with the tubular piece of the upper cover part being spaced from the lower cover part in such a way that space is left between the tubular piece of the upper cover part and the tubular piece of the lower cover part for the passage of gas and acid.

12 Claims, 7 Drawing Figures

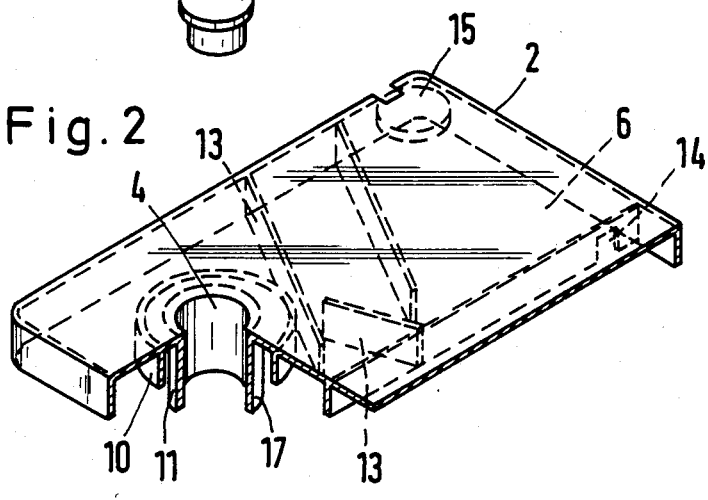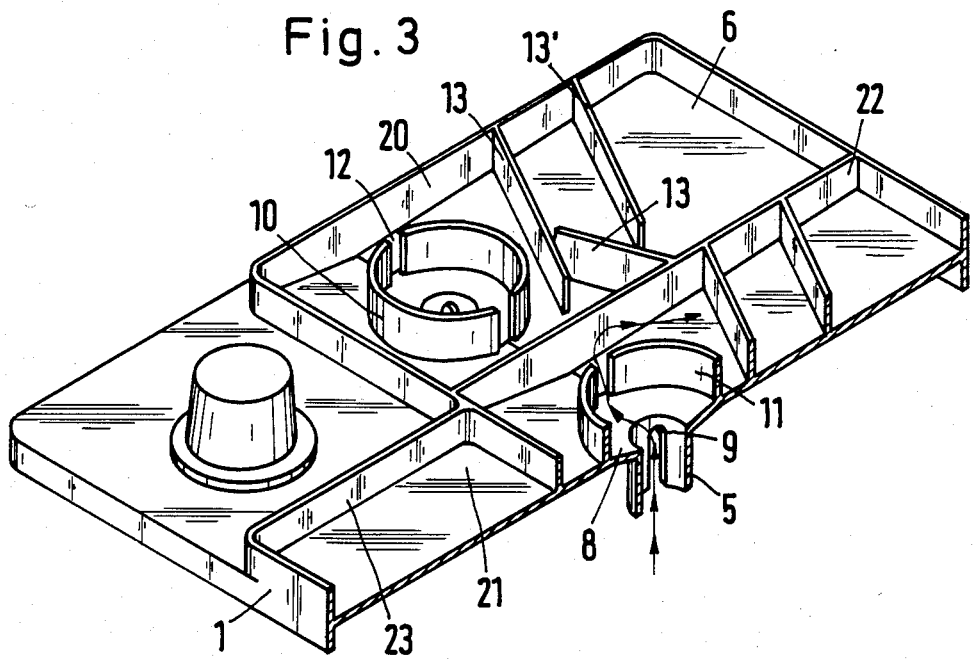

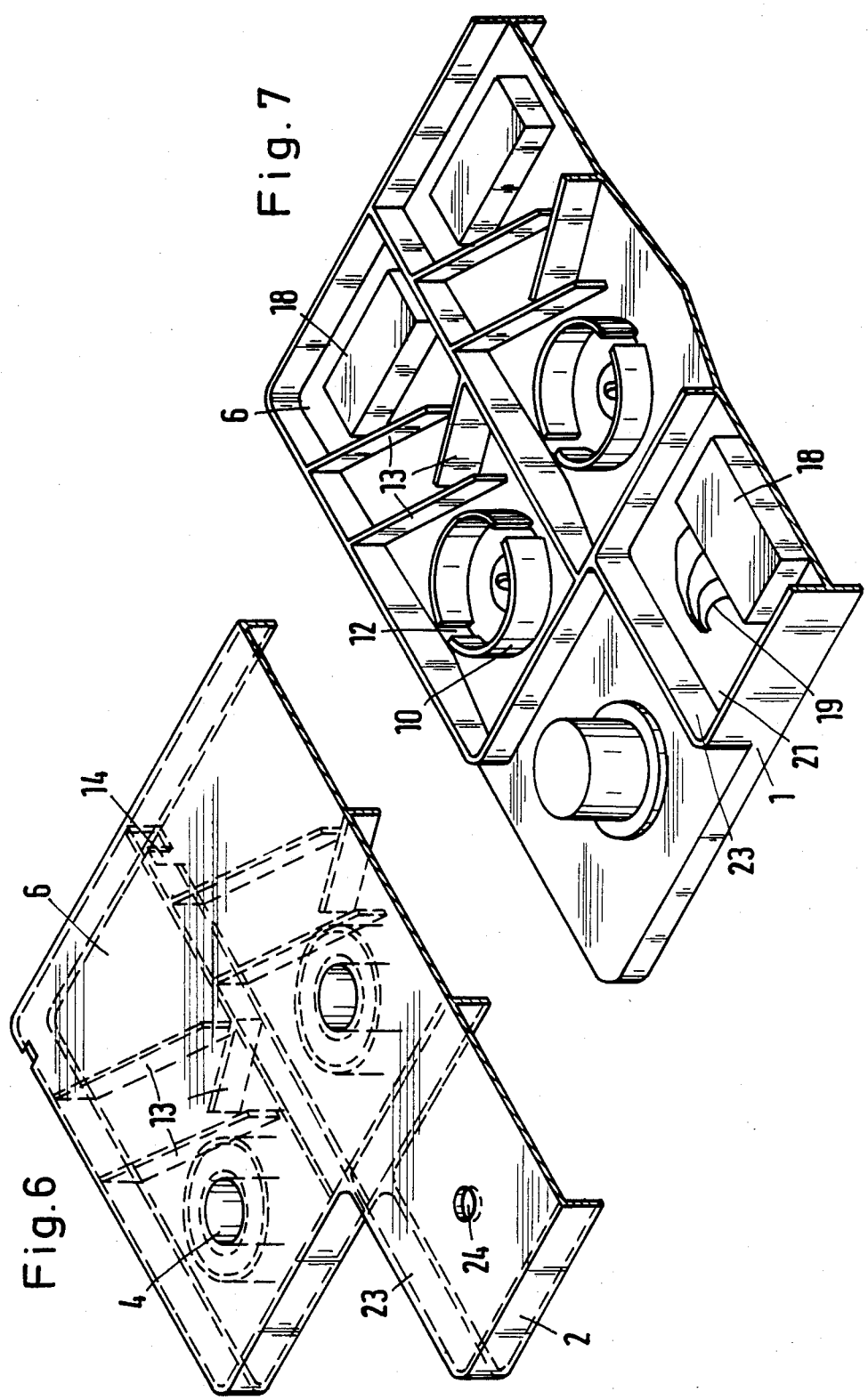

ately after production of the individual components, or during assembly of the battery in a production line; it should furthermore be possible with the inventive storage battery to test the seal of the connected parts either individually or in combination with the battery box of the battery.

STORAGE BATTERY

BACKGROUND OF THE INVENTION

The present invention relates to a storage cell or lead storage battery having a case closed-off by a block cover in which, for the purpose of separating-off acid, a hollow space is formed by means of a lower cover part and an upper cover part that is spaced from the lower cover part; in conformity with the number of cells, the hollow space is divided into interconnected chambers, each of which communicates at its deepest location with an associated cell via an opening which is in the form of a tubular member.

A storage battery of this general type having integrated acid-separating means is disclosed in German Gebrauchsmuster No. 80 07 719. In this known storage battery, for each cell the block cover has an opening which can be closed-off, and which is embodied in such a way that it forms a combination of fill opening, control opening, and safety opening, with the tubular-connection construction of this opening also assuming the function of providing a venting and return-flow opening for the separated-off acid. In so doing, the gas stream which escapes from each cell is deflected several times in the associated chamber, so that the acid mist contained therein is separated-off, and the gas is dried. The separated-off fluid flows back into the cells in a stream which is counter to the stream of the escaping gases. The thus dried quantity of gas can escape through connection openings provided between the individual chambers, and through a venting opening of the hollow space, especially through a flame-eliminating valve.

The drawback with the heretofore known storage battery is that with regard to the manufacture, to test the seal of the inwardly disposed cell connections, as well as of the connection between the bottom part of the cover and the battery box, it is absolutely necessary to fuse, glue, or otherwise connect the bottom part of the cover to the battery box before it can be connected to the upper part of the cover. Only without the upper part of the cover can the seals of the heretofore known storage battery be tested during manufacture of the battery. Thus it can be seen that it is impossible to prefabricate the block cover as a completed part which comprises the upper and bottom parts of the cover, and which must itself be tested to assure that the seals are adequate. In particular, the heretofore known method of manufacture, which is mandated by the construction of the block cover, offers no possibility for testing whether the chambers which form the hollow space are sealed for the purpose of separating-off acid. If a leak occurs, the gas deflection, gas drying, and separating-off of the acid mist no longer functions, since the previously described gas path with the appropriate deflections can be avoided by the escaping gases so that short-circuit flows can occur Such short-circuit paths caused by leaks calls the entire function of the battery into question.

A further drawback of the heretofore known storage battery is that the block cover has no chambers which are protected from acid for accommodating battery-monitoring elements and similar devices.

It is therefore an object of the present invention to provide a storage battery having an improved, integrated acid-separating means in the block cover, with the assembly of the latter being adapted to take place either directly after production of the individual components, or during assembly of the battery in a production line; it should furthermore be possible with the inventive storage battery to test the seal of the connected parts either individually or in combination with the battery box of the battery.

BRIEF DESCRIPTION OF THE DRAWINGS

These objects, and other objects and advantages of the present invention, will appear more clearly from the following specification in conjunction with the drawings, in which:

FIG. 1 shows a plug for a combination fill and monitoring opening of a cell of the inventive storage battery;

FIG. 2 shows a portion of one inventive embodiment of an upper battery cover part, which is detached from the bottom part of the cover;

FIG. 3 shows a portion of one inventive embodiment of a bottom part of a cover which is to be placed on a multi-cell battery, for example by being fused or glued thereto;

FIG. 6 is a partial plan view of one inventive embodiment of the upper cover part for a battery; and FIG. 7 is a partial plan view of one inventive embodiment of the bottom part of a cover for a battery, and is provided with supplemental elements.

SUMMARY OF THE INVENTION

Figure 4:
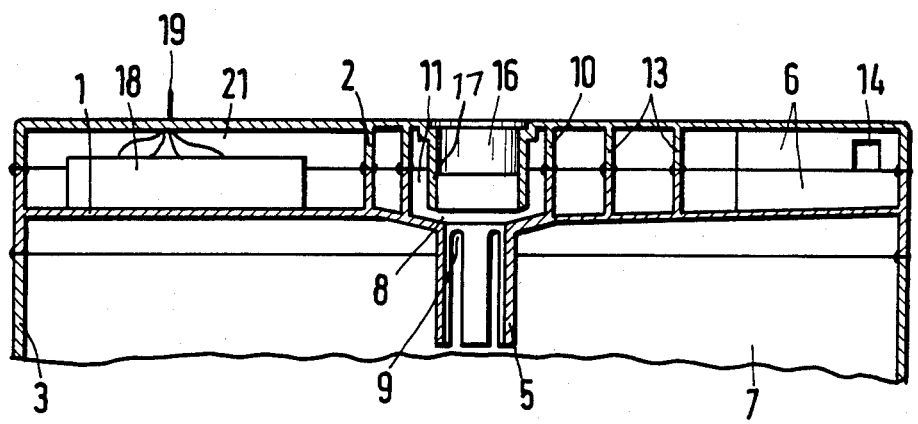
FIG. 4 is a longitudinal section through a portion of one inventive embodiment of a storage battery, with the section being taken through the fused-together parts of the double cover and the battery box.

The storage battery of the present ivnention is characterized primarily in that the tubular member comprises two separate tubular pieces which are coaxially disposed; one of the tubular pieces is provided on the lower cover part and extends away from the upper cover part and into a cell; the other of the tubular pieces is provided on the upper cover part and extends toward the lower cover part into the associated chamber; the tubular piece of the upper cover part has a greater diameter than does the tubular piece of the lower cover part, with the tubular piece of the upper cover part being spaced from the lower cover part in such a way that space is left between the tubular piece of the upper cover part and the tubular piece of the lower cover part for the passage of gas and acid.

Thus, the essential feature of the present invention is that the tubular member, which previously passed through the associated chamber, is now separated into two tubular pieces in such a way that the desired variability relative to the assembly of the block cover is achieved, and in addition it is possible to test the seal of the connected parts either individually (with the cover complete but not connected with the battery box), or connected with the battery box of the battery. The tubular piece which extends into the cell can also be reduced to a single opening in the lower cover part.

The passage for gas and acid is preferably annular, although under certain conditions holding elements can be provided as a support on the lower cover part to increase the mechanical load carrying capacity in the region of the plug. To facilitate the seal testing, it is furthermore expedient if that tubular piece which extends into the cell from the lower cover part not extend into the chamber, but rather terminate flush with the lower cover part. In the region of its opening, this lower cover part can be sloped in order, on the one hand, to facilitate the return flow of the acid, and, on the other hand, to facilitate the seal testing. That tubular piece which extends into the cell from the lower cover part can be provided with vertically extending slits as connecting or venting openings which interconnect the cell space and the hollow chamber space for the withdrawal of gas.

In order to multiply deflect the exiting gas, which includes acid mist, it is proposed pursuant to an expedient further embodiment of the present invention to surround that tubular piece which extends into the chamber from the upper cover part by a hollow cylinder which is disposed within the chamber and is spaced from the tubular piece; the hollow cylinder extends from the upper cover part to the lower cover part and forms an annular channel in such a way that the latter communicates via one or more openings with the hollow chamber space. The hollow cylinder can be divided into two corresponding parts, one of which is integral with the upper cover part and the other which is integral with the bottom cover part. It is advantageous to offset the openings provided in the hollow cylinder from the slits of the tubular piece. An improvement in the gas drying is advantageously achieved if labyrinth-like ribs are provided in each chamber for inducing a multiple deflection of the gas stream.

Pursuant to the preferred embodiment of the present invention, the chambers, while embracing the central fill openings of the storage battery, are disposed next to one another accompanied by the formation in each chamber of a space which is protected from splashing acid; a recombinator is placed in each chamber for the catalytic recombination of the hydrogen and oxygen gases to form water. The gas which is extensively freed of the acid mist, and which would otherwise escape into the atmosphere, possibly via a flame-eliminating valve, is in this embodiment of the invention returned in the form of water to the respective cell via catalytic recombination. As a result, the battery becomes maintenance-free over its entire service life. It is furthermore proposed pursuant to another embodiment of the present ivnention, to form separate, self-contained chambers between the upper and lower cover parts in the still free region between the two end terminals of the storage battery; these supplemental chambers are provided for accommodating sensors for recognizing the state of the battery, and also for accommodating control and regulating elements for controlling the charging and discharging of the battery. The necessary electrical and mechanical connections are conveyed outwardly in such a way that they are sealed relative to gas and electrolyte, and so that for the first time it is possible to accommodate electrical and electronic components in battery/block covers in such a manner that they are protected against acid. Examples of components include lighting generator regulators with tapping of the battery voltage as the parameter, as well as sensors for the load condition, density, fill state, internal pressure, temperature, and gasification; these components are installed in the supplemental chambers and can be used, for example, via measurement of the parameters and evaluation, to assure a reliable and useful operation of the motor vehicle.

In the inventively preferred storage battery, the bottom part of the cover, the upper part of the cover, and the battery box are separately injection molded as respective pieces from thermoplastic synthetic material. The upper and lower parts of the cover are subsequently glued or fused together as a prefabricated completed part, and the seal thereof is tested. The block cover is then glued or fused with the battery box, whereupon the interior of the battery can be seal tested through the openings of the cover. Finally, the tubular members of the openings can be closed off from the outside by means of a suitable plug.

The previously described inventive battery combines the advantages of an open system with the advantages of a closed system. The battery can be 100% maintenance-free, yet can remain serviceable so that possible defects, for example in the regulator of a lighting generator, do not immediately necessitate replacement of the battery. The battery can be stored in a dry-charged state. During operation, an effective drying of the gas is achieved via the double cover, so that the escape of acid mist is prevented. This protects the engine compartment and various electrical and electronic devices of a motor vehicle from corrosion.

DESCRIPTION OF PREFERRED EMBODIMENTS

Referring now to the drawings in detail, the illustrated block-cover embodiments and battery parts relate to a multi-cell lead storage battery or storage cell which has a battery box or container and cover of thermoplastic synthetic material that is centrally provided with fill openings in conformity with the number of cells. Such a starter battery has a non-illustrated, internally located cell connector, and two cell poles or terminals which pass through the bottom part 1 of the cover near the longitudinal side of the battery. Like the battery box 3, the bottom part 1 of the cover is made of thermoplastic synthetic material, and is tightly fused with the battery box 3 all the way around, as shown in FIG. 4.

The inventive storage cell is equipped with an integrated acid separation system. For this purpose, the lower part 1 of the cover is provided with upright wall-like strips 20 which are integral with the bottom part 1; in the manner of a frame, the wall-like strips 20 extend around the cell openings as well as around the entire battery region opposite the poles. Formed by partitions 22 are chambers 6 which, together with a correspondingly embodied upper prat 2 of the cover, form hollow spaces which are suitable for acid separation. This purpose is served by ribs 13 which extend at an angle to one another in each of the chambers 6; these ribs 13 induce a gas deflection. To improve the gas drying, a multi-deflection is provided for by additional ribs 13'. The important thing is that the gas expansion volume is considerably increased by the provision of the chambers 6. The multiple ribbing 13, 13' also further increases the stability.

As shown in FIG. 2, the described construction of the bottom part 1 of the cover corresponds with that of the upper part 2 of the cover, which is also made of thermoplastic synthetic material and is fused with the bottom part 1, as clearly shown, for example, in FIG. 4. The tight connection of the block-cover parts to one another—also in the form of a prefabricated complete part—and with the battery box, can also be undertaken by gluing.

Figure 5:
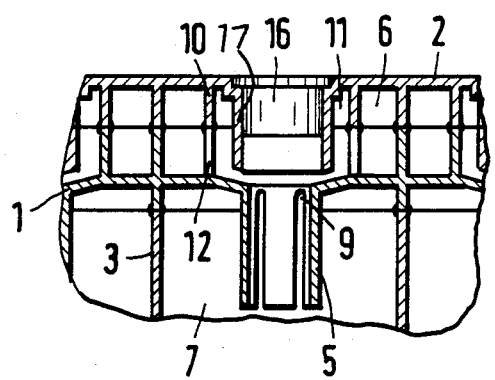
FIG. 5 is a cross section through a portion of the double cover and battery box.

A fill and monitoring opening 4, which can be closed off by a plug 16, is left free on the upper part 2 of the cover for each cell (FIG. 2). Each of the openings 4 extends into the hollow space of the associated chamber 6 in the form of a tubular piece 17 which ends above the bottom part 1 of the cover in such a way as to leave a free annular space between them, as clearly shown in FIGS. 4 and 5. From there, the fill and monitoring opening 4 continues via a reducing connector or tubular piece 5 which is integrally formed on the bottom part 1 of the cover and extends into the associated cell 7. The tubular piece 17 has a greater diameter than does the reducing connector 5 so that a testing device introduced through the opening 4 can rest firmly on the surface of the bottom part 1 of the cover.

That end of the reducing connector 5 which extends into the cell 7 is provided with a number of slits which extend to the base 8 of the chamber, thus forming venting openings 9. The base 8 of the chamber is provided with an appropriate slant toward the opening, thus forming a relatively greatly inclined annular cone, especially in the vicinity of the opening. Within the chamber, this annular cone is surrounded by a hollow cylinder 10 or a hollow cylindrical section, which extends from the base 8 of the chamber to below the upper part 2 of the cover to thus form an annular channel 11. Two oppositely disposed openings 12 are provided above the base 8 of the chamber in the hollow cylinder 10, or at the sides of the hollow cylinder sections. These openings 12 are offset relative to the venting openings 9 in order, as shown by arrows in FIG. 3, to induce deflection of the gas which is being discharged and includes acid mist. This gas rises from the cell chamber, through the reducing connector 5, passes through the annular gap between the base 8 and the tubular piece 17 into the annular channel 11, strikes the inner walls of the hollow cylinder 10, where it is deflected, and passes through the openings 12 into the chamber 6, which is provided with the ribs 13, 13'. The thus induced multiple deflection of the gas stream effects an intense drying of the gas, so that only subsequent to the gas drying does the now dry gas stream reach the cover venting means, which is provided with a flame-eliminating valve 15. By means of connection openings 14, the individual chambers 6 communicate with one another and with the venting means, which serves as a connection to the atmosphere.

Condensed and separated-off acid mist flows through the staggered ribs 13, 13', the hollow cylinder 10 or the hollow cylinder sections, and the reducing connector 5 back into the battery cells.

Basically, the provision of the chambers 6 significantly increases the gas expansion volume. Similarly, the stability is further increased by the presence of the hollow cylinder 11 and the ribs 13, 13'. Since the inventive block cover requires only one or two openings in each chamber 6 for venting and return flow per cell, there remains, due to the structural shape of the ribs 13, 13', a space which is protected not only from acid which splashes over, but also from acid mist; this space has an essentially dry gas atmosphere. Supplemental elements 18 can also be accommodated in this space.

Supplemental chambers, for example two adjacent supplemental or electronic chambers 21 are furthermore provided in the region between the two battery terminals for such supplemental elements 18. Wall-like members 23 which correspond with one another are integrally formed on the bottom part 1 and upper part 2 of the cover. After the cover parts 1 and 2 are fused together, these wall-like members 23 complement one another to form the supplemental chambers 21. The necessary electrical and mechanical connections are sealed relative to the gas and electrolyte, and are conveyed to the outside through the wall and/or the cover. Sensors, regulators, transmitters, and/or recombinators can be installed as the supplemental elements 18. In the illustrated embodiment, the measuring and power connections 19 of the elements 18 are guided to the outside through the upper part 2 of the cover through an opening 24 in such a way that they are sealed relative not only to dust and moisture, but also to gas and electrolyte. Thus, a block cover is provided, especially for maintenance-free starter batteries; for the first time, the cover has integrated elements for checking and controlling the battery. In the event respective recombinators are placed in the chambers 6 as supplemental elements 18, the flame-eliminating valves 15 and the connection openings 14 are dispensed with. Each recombinator is provided with a safety outlet opening, so that the gas which is liberated from the acid mist, and which could otherwise escape through the flame-eliminating valve 15, is returned to the respective cells through the recombinators, which form water.

In connection with the manufacture of the battery, the block box, bottom cover part, and upper cover part, are separately injection molded. The supplemental elements 18 and possibly the flame-eliminating valves 15 are then installed, whereupon the bottom part 1 of the cover is glued or fused with the upper part 2 of the cover. The completed cover is then checked to see whether the electronic supplemental chambers 21 and the chambers 6 are sealed relative to the surrounding air. The battery box 3, in which the complete cell construction is already accommodated, is then sealingly connected with the prefabricated block cover by being glued or fused thereto. A subsequent test to make sure that the block cover is sealed relative to the cells 7 is effected by introducing a test connector through the fill and monitoring opening 4 of the upper cover part 2 and placing it upon the reducing connector 5 of the bottom cover part 1.

The present invention is, of course, in no way limited to the specific disclosure of the specification and drawings, but also encompasses any modifications within the scope of the appended claims.

What we claim is:

1. A storage battery having a case closed-off by a block cover in which, for the purpose of separatingoff acid, a hollow space is formed by means of a lower cover part that is connected to said case, and an upper cover part that is spaced from said lower cover part; in conformity with the number of cells, the hollow space is divided into interconnected chambers, each of which communicates at its deepest location with an associated cell via an opening which is in the form of a tubular member;

the improvement wherein each of said tubular members comprises two separate tubular pieces which are coaxially disposed; one of said tubular pieces is provided on said lower cover part and extends away from said upper cover part and into the associated cell; the other of said tubular pieces is provided on said upper cover part and extends toward said lower cover part into the associated chamber; the tubular piece of said upper cover part has a greater diameter than does the tubular piece of said lower cover part, with the tubular piece of said upper cover part being spaced from said lower cover part in such a way that space is left between said tubular piece of said upper cover part and said tubular piece of said lower cover part for the passage of gas and acid.

2. A storage battery according to claim 1, in which said tubular piece of said lower cover part is reduced to a single opening in the latter.

3. A storage battery according to claim 2, in which said space for the passage of gas and acid is annular.

4. A storage battery according to claim 1, in which that portion of said tubular piece of said lower cover part remote from the associated cell is flush with said lower cover part.

5. A storage battery according to claim 4, in which the tubular piece of said lower cover part is provided with venting openings in the form of slits which extend in the direction of said coaxial tubular pieces.

6. A storage battery according to claim 5, in which the tubular piece of said lower cover part does not extend into the associated chamber.

7. A storage battery according to claim 6, in which each chamber has disposed therein a hollow cylinder which surrounds, and is spaced from, the tubular piece of said upper cover part to thereby form an annular channel around said last-mentioned tubular piece; said hollow cylinder is provided with at least one opening, so that said annular channel communicates with said chamber.

8. A storage battery according to claim 7, in which said openings of said hollow cylinder are offset relative to said slits of said tubular piece of said lower cover part.

9. A storage battery according to claim 8, in which said upper and lower cover parts are provided with respective ribs which extend into said chambers and correspond with one another.

10. A storage battery according to claim 8, which includes central fill openings; and in which said chambers, while embracing said fill openings, are disposed next to one another accompanied by the formation, in each of said chambers, of a space which is protected from splashing acid; disposed in each of said lastmentioned spaces is a respective recombinator for the catalytic recombination of hydrogen and oxygen gases to form water.

11. A storage battery according to claim 8, which includes two end terminals, and space therebetween not embraced by said chambers, with said last-mentioned space being, provided, between said upper and lower cover parts, with separate, self-contained supplemental chambers which are adapted to accommodate not only sensors for recognition of the state of said battery, but also, selectively, control and regulating elements for controlling charging and discharging of said battery.

12. A storage battery according to claim 11, in which said supplemental chambers are provided with walls, at least some of which are provided with electrical and mechanical connections that are sealed relative to battery gas and electrolyte.

* * * * *